(12) United States Patent
Schopp et al.

(10) Patent No.: US 6,170,895 B1
(45) Date of Patent: Jan. 9, 2001

(54) ARTICULATED GRASPING APPARATUS

(76) Inventors: Edgar Schopp; Eddy K. Schopp, both of 2210 Gratton St., Riverside, CA (US) 92504

( * ) Notice: Under 35 U.S.C. 154(b), the term of this patent shall be extended for 0 days.

(21) Appl. No.: 09/446,494

(22) PCT Filed: Jun. 24, 1998

(86) PCT No.: PCT/US98/13021

§ 371 Date: Dec. 16, 1999

§ 102(e) Date: Dec. 16, 1999

(87) PCT Pub. No.: WO99/00223

PCT Pub. Date: Jan. 7, 1999

Related U.S. Application Data

(60) Provisional application No. 60/050,896, filed on Jun. 26, 1997.

(51) Int. Cl.[7] .................................................... B25J 15/08
(52) U.S. Cl. ............................... 294/88; 294/116; 294/902
(58) Field of Search ............................ 294/88, 106, 115, 294/116, 119.1; 901/36–39

(56) References Cited

U.S. PATENT DOCUMENTS

| | | | |
|---|---|---|---|
| 4,892,344 | 1/1990 | Takata et al. .......................... | 294/88 |
| 5,234,244 | 8/1993 | Kim ....................................... | 294/88 |
| 5,383,697 | 1/1995 | Roudaut ................................ | 294/88 |

*Primary Examiner*—Johnny D. Cherry
(74) *Attorney, Agent, or Firm*—Gene Scott-Patent Law & Venture Group

(57) ABSTRACT

A grasping apparatus (10) has multiple fingers (64) joined within slots (56) in the face of a moving piston (50) within a fluid cylinder (20). As the piston (50) moves, cams (62) joined to the fingers (64) are rotated so as to close or open the fingers (64) which are radially mounted. Once actuated the piston (50) is returned to its relaxed position by a spring (70) when fluid pressure is released.

9 Claims, 2 Drawing Sheets

ARTICULATED GRASPING APPARATUS

This application is a 371 of PCT/US98/13021 filed Jun. 24, 1998 and is based upon and uses the technology defined and described in a U.S. Provisional patent application, Ser. No. 60/050,896 filed Jun. 26, 1997.

BACKGROUND OF THE INVENTION

1. Field of the Invention

This invention related generally to robotic grasping devices, and more particularly to an articulated grasping apparatus having opposing digits capable of closing onto an article for the purpose of engaging such an article in order to place or position the article.

2. Description of Related Art

The following art defines the present state of this field:

Sokolow, U.S. Pat. No. 3,981,673 describes an apparatus for transferring parisons from an oven to a blow mold has the capability of straightening up titled parisons and gripping them uniformly without flattening the ends. The apparatus includes a gripper with jaws which open wide when opened, thereby providing an entry space between the jaws for titled parisons as well as an upright parison and which in the closed position form an essentially complete circle about the parison to uniformly grip the same in cooperation with a push piece which moves into the open end of the parison.

Evans et al., U.S. Pat. No. 3,651,958 describes a transfer carriage movable between a station and a machine tool having a pair of work carriers movable independently along intersecting paths operable to pick up a work piece and to deposit in its place another work piece, both at the station and at the machine tool.

Bende, U.S. Pat. No. 3,400,836 describes an apparatus for grasping, holding and transferring a work piece on a high speed production line. The clamp is biased to the closed position to prevent slippage of the work piece during transfer. Cam controls regulate the movement of the clamp from a folded or stored position to a grasping position and then closed and open the clamp at the appropriate time in the cycle of the apparatus.

Panyard, U.S. Pat. No. 5,588,794 provides a gripper for mounting to a distal end of a robotic arm for gripping a work piece having a pair of spaced apart longitudinally extending contoured faces and at least two extending cylindrical bores, each cylindrical bore having an inner surface, the gripper including a base, a pair of spaced apart longitudinally extending stabilizing members each affixed to the base, each of the stabilizing members having an engagement surface adapted to abuttingly engage a respective contoured face of the work piece, at least one pair of opposing clamping arms, each clamping arm being pivotal from a first position wherein the clamping arm is disposed adjacent a respective cylindrical bore to a second position wherein the clamping arm abuttingly engages the inner surface of a cylindrical bore, a pair of biasing cylinder means connected to one of said pair of clamping arms for moving said one clamping arm from said first position to said second position, a pair of spaced apart compliant devices affixed to the base for releasably connecting the base to the distal end of the robotic arm and a control system for selectively controlling the actuation of the biasing cylinders.

Inaba et al., U.S. Pat. No. 4,540,212 describes an industrial robot hand having swing fingers for gripping a work pivotally mounted on a hand base member which is attached to the free end of a wrist unit, said swing fingers being members formed of a sheet metal through a pressing process in a U-shaped cross-section, and said swing fingers having a U-shaped cross-section and a hydraulic actuator linked together with chain pin links.

Asamoto, U.S. Pat. No. 3,945,676 describes a gripping device for use in an industrial robot or manipulator including a pair of clamp arms mounted on a base plate of the device and connected with a clamp arm operating rod through a pair of links and a cylinder-piston assembly having a misgrip detecting mechanism. One of the pair of clamp arms is shorter than the other clamp arm and is provided with an additional clamp arm swingable with respect to the sort clamp arm. The misgrip detecting mechanism is operated by the action of a pressure switch provided in a hydraulic fluid conduit connected between the hydraulic fluid supplying source and a pressure chamber formed within the cylinder-piston assembly. Thus, the gripping device can positively and effectively grip a work piece.

McGill, U.S. Pat. No. 3,125,370 relates to article grippers, and particularly to apparatus for picking up articles such as bottles, containers or the like, transporting them a distance, and then depositing the articles in a second position. The general object of the present invention is to provide novel and improved bottle gripper apparatus characterized by the self-centering action thereof when any of the bottle grippers are moved laterally from their normal centered position. A further object of the invention is to provide a pivotally positioned substantially parallelogram shaped means in the assembly of gripping jaws and associated controls in article grippers and wherein a pair of laterally spaced lost-motion connecting means are present and have associated compressed coil springs urging the lost motion means to the extremities of their positions normally, but with one such lost motion means being adapted to be moved outwardly of the parallelogram when the article grippers are moved laterally to further compress on positioned coil spring means and aid in snapping the means back into a normal centered position when the external force applied thereto is removed.

The prior art teaches similar devices to the instant invention which are useful for similar application. However, the prior art does not teach a grasping device of such compact design and wherein sliding members of the actuated fingers are engaged and movable within the material that makes-up a fluid piston. This inventive concept provides significant advantages in miniaturization, clearance requirements when in use, and simplicity of operation. The present invention fulfills these needs and provides further related advantages as described in the following summary.

SUMMARY OF THE INVENTION

The present invention teaches certain benefits in construction and use which give rise to the objectives described below.

The present invention provides a grasping apparatus having multiple fingers joined to a moving piston within a fluid driven cylinder such as an air cylinder. As the piston moves, cams joined to the fingers are rotated so as to close or open the fingers which are radially mounted. Once actuated, the piston is returned to the relaxed position by a spring.

A primary objective of the present invention is to provide a grasping apparatus having advantages not taught by the prior art.

Another objective is to provide such a grasping apparatus with an adjustable range of grasping capability by adjustment of individual fingers of the device.

A further objective is to provide such a grasping apparatus that is highly compact and simple in construction as compared to the prior art.

A still further objective is to provide such a grasping apparatus that is air actuated but with a spring return so as to eliminate complex valve arrangements.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
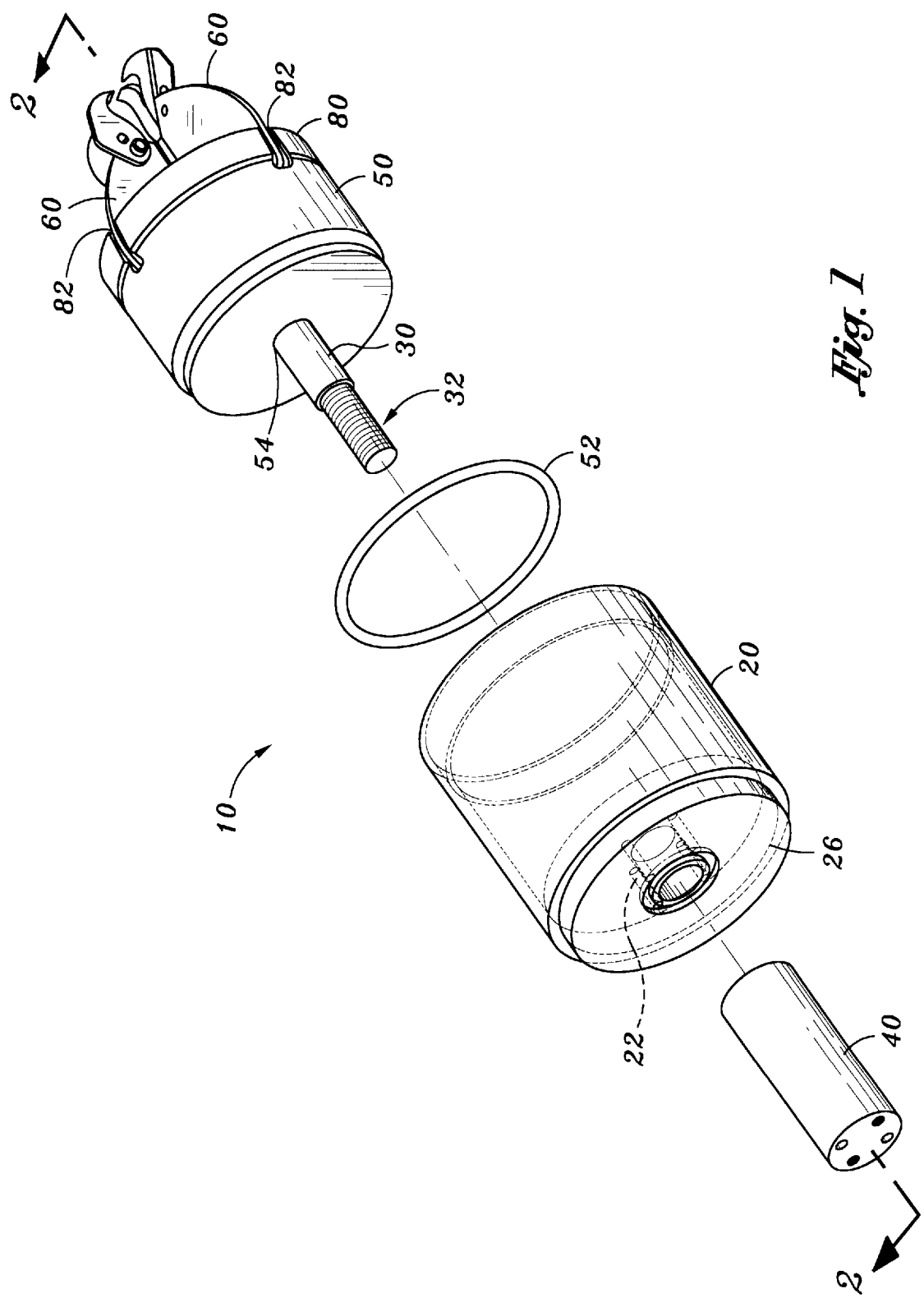
FIG. 1 is an exploded perspective view of the preferred embodiment of the present invention shown from a fluid inlet end and with four fingers shown in the actuated position.
Figure 3:
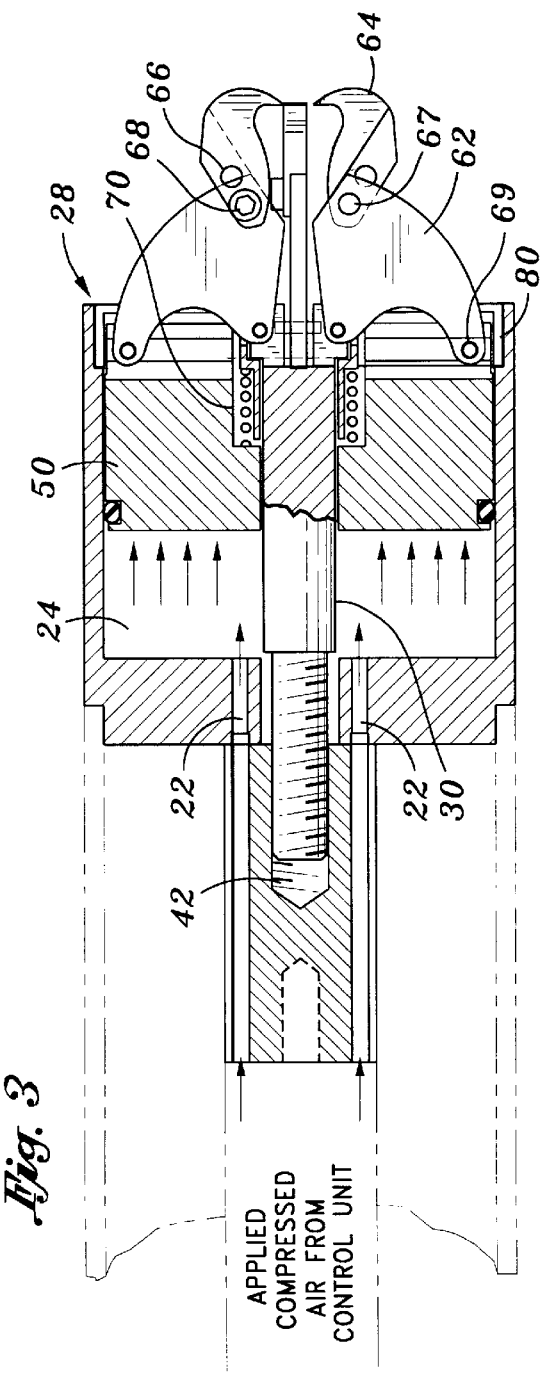

The above described drawing figures illustrate the invention, a fluid actuated, articulated grasping apparatus 10 comprising, as shown in FIG. 1, a fluid cylinder 20 having a conduit means 22, i.e., through holes, for admitting a fluid into a first side 24 (FIG. 3) of the fluid cylinder 20 and an actuating rod 30 axially positioned within the fluid cylinder 20, a proximal end attachment portion 32 of the actuating rod 30 extending outwardly from an end wall 26 of the fluid cylinder 20 and held thereon by an engaging fluid inlet and securement means 40.

Figure 2:
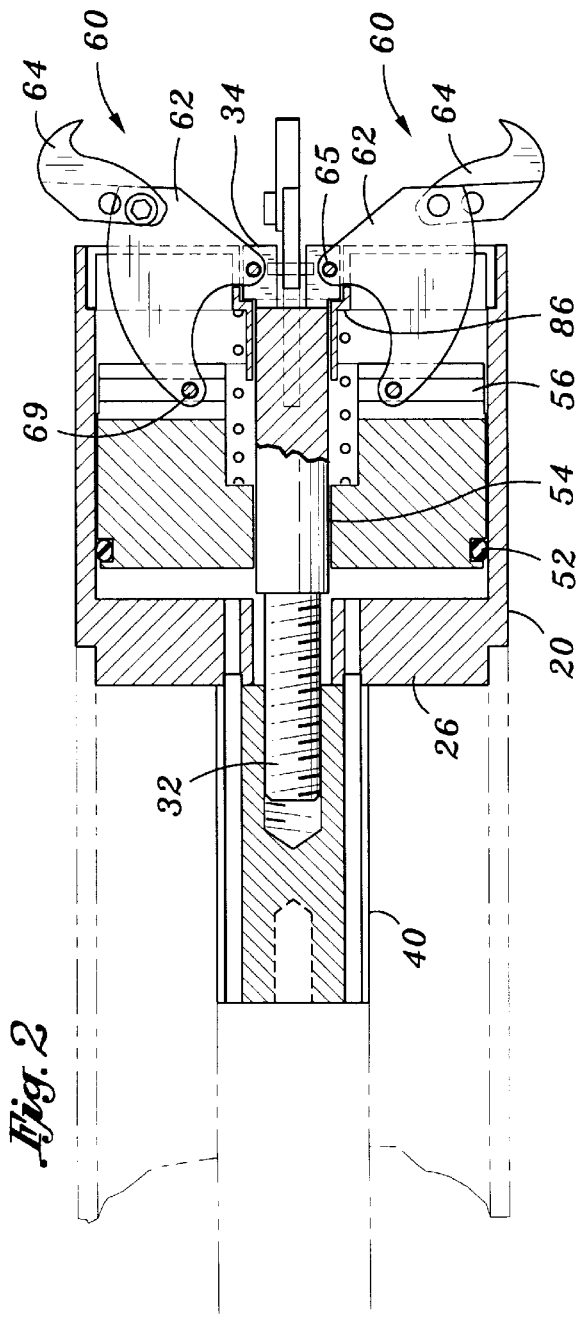
FIGS. 2 and 3 are sectional views taken along line 2—2 of FIG. 1, but adapted by rotating the grasping means of the invention into the plane of the paper, and showing the apparatus as assembled and in a relaxed position (FIG. 2), and in an actuated position (FIG. 3).

A piston 50 is adapted by a sealing ring 52 for fluid forced linear motion within the fluid cylinder 20, the piston 50 providing an axial aperture 54 for tight-fitting sliding engagement along the actuating rod 30 and a plurality of radially oriented grasping means 60, each of the grasping means 60 providing a cam portion 62 and a finger portion 64, as best seen in FIG. 2, the cam portion 62 being pivotally joined, at first pin means 65, with a distal end 34 of the actuating rod 30 and pivotally and slidingly joined, at second pin means 69, with a radially positioned slot means 56, within piston 50, in such manner that as the piston 50 moves along the actuating rod 30 away from the end wall 26 of the fluid cylinder 20, the finger portions 64 of the plurality of grasping means 60 converge, and conversely, when the piston 50 moves toward the end wall 26 of the fluid cylinder 20, the finger portions 64 of the grasping means 60 diverge, and in both movements of the grasping means 60, the second pin means 69 moves linearly and radially within the radially positioned slot means 56.

A spring biasing means 70 is fitted about the actuating rod 30 and is adapted, by its length and spring constant, for urging the piston 50 toward the end wall 26 of the fluid cylinder 20. Therefore, when fluid is injected into the fluid cylinder 20 through the fluid conduit means 22, as shown graphically in FIG. 3, the fluid cylinder tends to move the piston 50 away from the end wall 26 of the fluid cylinder 20 and compresses the spring biasing means 70, thereby storing spring potential energy; while when fluid is allowed to exit the fluid cylinder 20 through the fluid conduit means 22, the spring biasing means 70 forces the piston 50 toward the end wall 26 of the fluid cylinder 20 thereby releasing its stored energy.

The cam portion 62 and the finger portion 64 of each of the grasping means 60 may be formed as a single integral part as is well known in the art. Alternatively, the finger portion 64 of each of the grasping means 60 may be adapted for positional adjustment on its respective cam portion 62 so as to enable the grasping means 60 to adapt to a desired range of grasping articulation, i.e., a larger range of motion or a smaller range of motion. As will be seen in FIG. 3, cam portion 62 may have a threaded hole 67, while finger portion 64 may have a plurality of corresponding clearance holes 66, holes 66 and 67 being designed for accommodating hex-socket head screws 68 for fastening the finger portion 64 at a selected position relative to cam portion 62.

A cover plate 80 is adapted, by its size and shape, for engaging an open end 28 of the fluid cylinder 20, the cover plate 80 providing a radial slot means 82 for accommodating movement of the grasping means 60 therein and an annular shoulder 86 for positioning the spring bias means 70 as well as acting as a stop surface therefor. Note that distal end 34 of actuating rod 30 is adapted by its diameter for capturing cover plate 80 so as to hold coverplate 80 tightly within the open end 28 of the fluid cylinder 20 when fluid inlet and securement means 40 is tightened onto the proximal end 32 of the actuating rod 30.

Preferably, the proximal end 32 of the actuating rod 30 and the engaging fluid inlet and securement means 40 are joined by a screw thread means 42, i.e. a male machine thread on the actuating rod 30 and a corresponding female machine thread on the fluid inlet and securement means 40.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A fluid actuated, articulated grasping apparatus comprising:

a fluid cylinder having a fluid conduit means for admitting fluid into a first side of the fluid cylinder;

an actuating rod axially positioned within the fluid cylinder, an attachment portion at a proximal end of the actuating rod extending outwardly from an end wall of the fluid cylinder and held thereon by an engaging fluid inlet and securement means;

a piston, adapted for fluid forced linear motion within the fluid cylinder, the position providing an axial aperture for tight-fitting sliding engagement along the actuating rod;

a plurality of radially oriented grasping means, each of the grasping means providing a cam portion and a finger portion, the cam portion being pivotally joined with a distal end of the actuating rod and pivotally and slidingly joined with the piston in such manner that as the piston moves along the actuating rod away from the end wall of the fluid cylinder the finger portions of the plurality of grasping means converge, and conversely, when the piston moves toward the end wall of the fluid cylinder, the finger portions of the grasping means diverge;

a spring biasing means fitted about the actuating rod and adapted for urging the piston toward the end wall of the fluid cylinder;

such that fluid injected into the fluid cylinder through the fluid conduit means moves the piston away from the end wall of the fluid cylinder and compresses the spring biasing means, while when fluid is allowed to exit the fluid cylinder through the fluid conduit means, the spring biasing means forces the piston toward the end wall of the fluid cylinder.

2. The apparatus of claim 1 wherein the cam portion and the finger portion of each of the grasping means are formed integrally.

3. The apparatus of claim 1 wherein the finger portion of each of the grasping means is adapted for positional adjustment on the respective cam portion of each of the grasping means so as to enable the grasping means to adapt to a required range of grasping articulation.

4. The apparatus of claim 1 further comprising a cover plate adapted for engaging an open end of the fluid cylinder, the cover plate providing a radial slot means for accommodating movement of the grasping means therein and an annular shoulder for positioning the spring biasing means.

5. The apparatus of claim 1 wherein the proximal end of the actuating rod and the engaging fluid inlet and securement means are joined by a screw thread means.

6. A fluid actuated, articulated grasping apparatus comprising:

a fluid cylinder having a fluid conduit means for admitting fluid into a first side of the fluid cylinder;

an actuating rod axially positioned within the fluid cylinder;

a piston, adapted for fluid forced linear motion within the fluid cylinder, the piston providing an axial aperture for tight-fitting sliding engagement along the actuating rod;

a plurality of radially oriented grasping means, each of the grasping means providing a cam portion and a finger portion, the cam portion being pivotally joined with a distal end of the actuating rod and pivotally and slidingly joined with the piston in such manner that as the piston moves along the actuating rod away from the end wall of the fluid cylinder the finger portions of the plurality of grasping means converge, and conversely, when the piston moves toward the end wall of the fluid cylinder, the finger portions of the grasping means diverge;

a spring biasing means positioned and adapted for urging the piston toward the end wall of the fluid cylinder;

such that fluid injected into the fluid cylinder through the fluid conduit means moves the piston away from the end wall of the fluid cylinder and compresses the spring biasing means, while when fluid is allowed to exit the fluid cylinder through the fluid conduit means, the spring biasing means forces the piston toward the end wall of the fluid cylinder.

7. The apparatus of claim 6 wherein the cam portion and the finger portion of each of the grasping means are formed integrally.

8. The apparatus of claim 6 wherein the finger portion of each of the grasping means is adapted for positional adjustment on the respective cam portion of each of the grasping means so as to enable the grasping means to adapt to a required range of grasping articulation.

9. The apparatus of claim 6 further comprising a cover plate adapted for engaging an open end of the fluid cylinder, the cover plate providing a radial slot means for accommodating movement of the grasping means therein.

\* \* \* \* \*